Sept. 11, 1962 R. F. STOLL 3,053,494
HANGER
Filed April 15, 1960
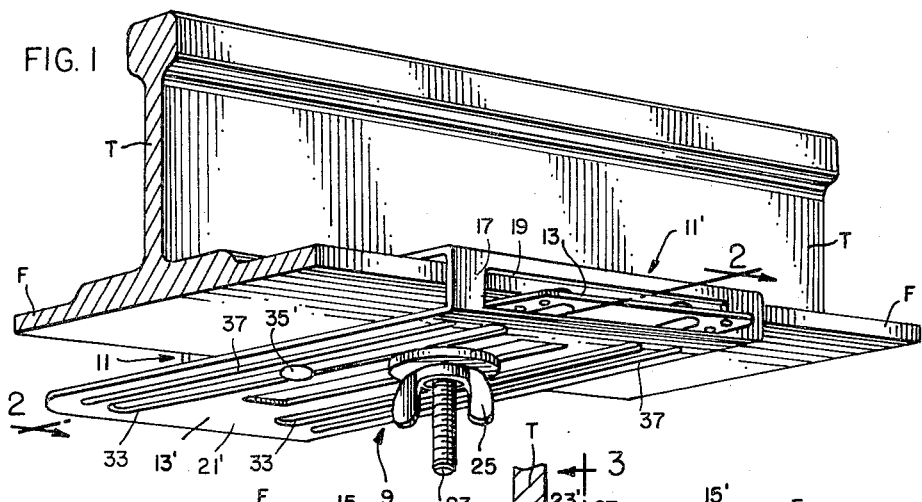
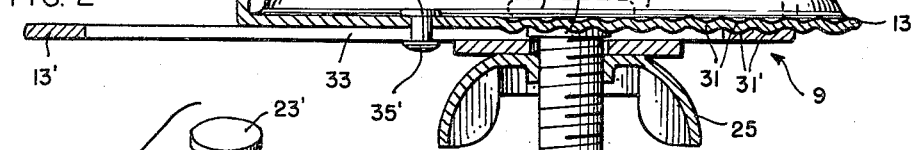
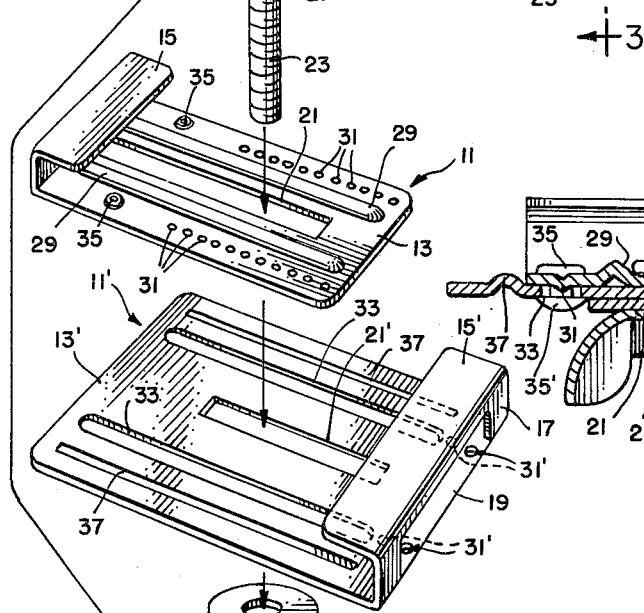
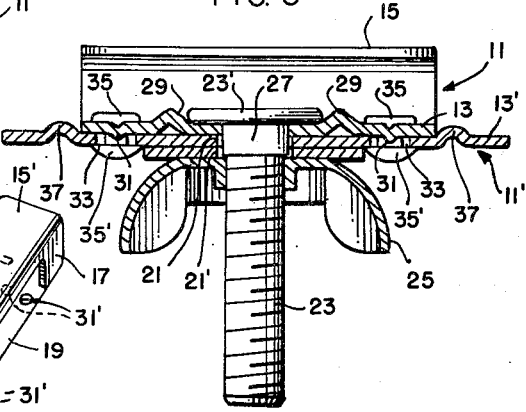
INVENTOR:—
RUSSELL F. STOLL
BY:—
Marzall, Johnston, Cook & Root
ATT'YS

United States Patent Office 3,053,494
Patented Sept. 11, 1962

3,053,494
HANGER
Russell F. Stoll, Northbrook, Ill., assignor to Daniel
Woodhead Company, Chicago, Ill., a corporation of
Illinois
Filed Apr. 15, 1960, Ser. No. 22,625
9 Claims. (Cl. 248—228)

The present invention relates in general to suspension devices, and has more particular reference to a hanger for supporting electrical fixtures on the base flanges of bulb T beams now commonly used in ceiling construction.

An important object of the present invention is to provide an electrical fixture mounting clamp comprising a pair of cooperating, relatively shiftable clips formed for detachable engagement with the base flange of a T beam and a clamping bolt with nut for securing the clips in flange engaging position, the clips being formed of relatively lightweight sheet metal suitably configurated to enhance the strength and rigidity of the hanger, through the mutual cooperation of its constituent parts, when the same is in mounted position on a T beam.

Another important object is to provide a hanger embodying a pair of longitudinally adjustable clips having blade portions formed for relative sliding movement, the one upon the other, and having turned lips or lugs on the blades in position for interengagement with the opposite edges of a beam flange, wherein at least one of the clips is formed with longitudinally extending rib means for strengthening and rigidifying the structure; a further object being to form one of the clips with a pair of spaced apart, parallel ribs in position to rest against the underside of a beam flange on which the hanger is mounted, while permitting the head of a clamping bolt to slide freely with respect to the beam flange, between said ribs, the sheet metal clips being provided with registering slots extending longitudinally and medially between the ribs for the sliding reception of the bolt therein.

Another important object is to provide latching dimples or cavities on the blade of one clip component in position to receive latch projections formed on the blade of the other, whereby to tighten the clip components together on the flange of a beam, in ratchet-like fashion, and thus secure the hanger on the beam, prior to the tightening of the clamping nut upon the bolt in order firmly to secure the clips together in beam mounted position; a further object being to provide longitudinally extending slots in the blade of one clip component of the hanger and studs or rivets in position on the other to slidingly engage in said slots, to thereby permanently secure the cooperating clip components together in fashion producing ratchet-like cooperation between the projections formed in one component and projection receiving cavities or dimples in the other, and also to limit the relative longitudinal extension of the clip components within a safe load carrying adjustment; a still further object being to make one of the sheet metal clips narrower than the other, and to form the wider clip with a slot for slidingly and guidingly receiving the blade portion of the narrower clip therethrough.

The foregoing and numerous other important objects, advantages and inherent functions of the invention will become apparent as the same is more fully understood from the following description, which, taken in connection with the accompanying drawing, discloses a preferred embodiment of the invention.

Referring to the drawings:

FIG. 1 is a perspective view of a T beam having a hanger embodying the present invention disposed in mounted position on the base flange of the beam;

FIGS. 2 and 3 are sectional views taken substantially along the lines 2—2 and 3—3 in FIGS. 1 and 2, respectively; and FIG. 4 is an exploded view of the hanger showing its component parts in perspective illustration.

To illustrate the invention the drawings show a suspension device or hanger 9 adapted to support electrical fixtures, such as outlet boxes and the like, on the flange F of a T beam T of a sort now commonly used in ceiling constructions.

The suspension device 9 may conveniently comprise a pair of formed sheet metal clips 11 and 11', one wider than the other and both embodying a relatively flat blade portion 13, 13', and an integral rebent beam flange engaging lip 15, 15', formed on each blade portion, as at an end thereof. The wider clip 11' has a lip supporting web 17 formed with an elongated opening 19 through which the blade of the narrower clip 11 may slidingly extend, so that the spaced apart facing lips 15, 15' of the components may be moved toward and away from each other in order to clampingly engage the opposite edges of the base flange of the T beam, the blade 13 of the narrower clip overlying and riding upon the blade of the wider one, in position to directly engage the underside of the T beam flange F, when the hanger is in mounted position thereon.

The blades 13 and 13' of the clips may be formed medially with registering, longitudinally extending slots 21, 21' through which a clamping bolt 23 may extend, said bolt having a head 23', an associated clamp nut 25, and a square portion 27, immediately beneath its head. The square portion of the bolt is adapted to extend in the alined slots 21, 21' of the clip blades, to thus prevent relative rotation of the bolt with respect to the clips, the disc-like head 23' of the bolt being adapted to engage and ride upon the upper surface of the blade 13 of the clip 11, on opposite sides of the slot 21, to thereby retain the bolt in assembled position in the hanger.

Outwardly of the bolt head 23', the blade 13 of the clip 11 may be formed with a pair of upstanding, longitudinally extending ribs 29 parallel with and disposed on oppoiste sides of the slot 21, the uppermost portions of the ribs 29 being adapted to engage the underside of the T beam flange F, when the hanger is attached thereto. The ribs 29 are high enough to permit the head 23' of the clamp screw to move freely beneath the beam when the hanger is attached thereon, thereby permitting the clamping screw to be adjusted to any desired position in the alined slots 21, 21', transversely of the T beam, before the clamp nut 25 is screwed down upon the bolt 23, to thereby clamp the components 11 and 11' together in mounted position on the beam.

Outwardly of the ribs 29, the blade 13 of the clip 11 may be formed with a plurality of spaced apart dimples 31 forming rows of correspondingly spaced apart, downwardly extending projections on the underside of the blade, disposed adjacent and inwardly of its opposite side edges, each adjacent pair of projections in each row being disposed in position selectively to engage a pair of upwardly facing detent dimples or cavities 31' formed in the blade 13' of the wider clip 11', immediately inwardly of the opening 19 and in alinement with longitudinally extending slots 33 formed in the blade 13' between the cavities 31' and the remote end of the blade. The clips 11 and 11' may be slidingly connected together, for relative longitudinal movement, by means of studs or rivets 35 secured, as by riveting to the blade of one component, in position to slidingly extend in slots formed in the other. The studs 35 are preferably secured upon the beam engaging blade 13 in alinement with the rows of projection forming dimples 31 and in position to extend slidingly in the slots 33 of the clip blade 13', the studs having heads 35' in position to slidingly engage the underside of said blade, to hold the blades of the clips loosely together for relative sliding movement.

It will be seen from the foregoing that the clips 11 and 11' are premanently secured together by the studs 35, and that said studs, in conjunction with the slots 33 limit the opening movement of the hanger components to a position of maximum extension so that the hanger components can not be shifted apart to an extended position in which the hanger is not strong enough to support such weight as may be supplied thereto in hanging heavy fixtures thereon. The projections formed upon the underside of the blade 13, by the dimples 31, perform a ratchet action in the detent cavities 31', as the lips 15, 15' of the clips are pressed together upon the opposite edges of the beam flange F. As a consequence, the hanger may be attached upon the beam flange and held in place thereon, by the action of the projections in the detent cavities, while the clamp nut 25 is loose upon or entirely detached from the bolt 23, which accordingly may be easily adjusted in the mounted hanger to any desired position transversely of the beam. The nut 25 may then be screwed down upon the bolt 23 in order to tightly secure the blades of the clip components together.

Outwardly of the slots 33, the blade of the wider clip component may be provided with rigidifying ribs 37. The ribs 29 of the narrower component, of course, also provide a strengthening and rigidifying function. Because of the strengthening effect provided by the ribs 29 and 37, longitudinally of the clips, as well as the rigidifying effect attained by bending the attaching lips or tongues 15, 15' from the blades 13, 13' along bend lines extending at right angles with respect to the ribs 29 and 37, the clip components are unusually rigid and strong although formed from relatively thin gauge, sheet metal stock.

It will be noted that the flange engaging tongues or lips 15, 15' of the clips are inclined, from their blade connected ends, slightly outwardly or away from the clip blades, so as to accommodate T beam flanges of various thickness. It will, of course, be understood that outlet boxes and other similar fixtures may be assembled on the beam mounted clamp before the nut 25 is applied upon the bolt, whereby the nut may serve to secure the fixture on the hanger as well as to clampingly secure the hanger clips together in mounted position on the beam flange F.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, and a clamping bolt extending through the clips to secure them together, the blade of one clip being formed with spaced ribs in position to engage the surface of the beam flange between its opposite edges, whereby the head of said clamping bolt may extend in the space between said ribs in position to move freely with respect to the beam flange.

2. A hanger as set forth in claim 1, wherein the clip having the ribbed, flange engaging blade is narrower than the other clip, said other clip being formed with a slot for slidingly receiving the ribbed blade of the narrower clip.

3. A hanger as set forth in claim 1, wherein the clip having the ribbed, flange engaging blade is narrower than the other clip, the blade of said other clip being formed with spaced apart, longitudinally extending, strengthening ribs along the opposite side edges of the overlying blade of the narrower clip.

4. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, and a clamping bolt extending through the clips to secure them together, said bolt having a head, the blades of said clips having registering slots extending longitudinally thereof for receiving the clamping bolt therethrough, the blade of one clip being adapted to engage the surface of the beam flange between its opposite edges, said flange engaging blade being formed with spaced flange engaging ribs disposed on opposite sides of and extending parallel with respect to said registering slots, and the head of said clamping bolt extending in the space between said ribs, whereby the bolt may be freely adjusted longitudinally of said slots, when the hanger is in mounted position on the beam flange.

5. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, a clamping bolt extending through the clips to secure them together, and a series of projections on one of said blades in position selectively to latchingly engage a detent on the other blade, whereby to latch the clips together in flange engaging position on the beam flange, said other blade having a longitudinal slot in alinement with and terminating adjacent said detent in position to receive the projections other than the one in latching engagement with the detent.

6. A hanger comprising a pair of cooperating clips formed each with a blade and a flange gripping portion, one of said blades being supported on and movable relatively with respect to the other, to holdingly engage the said flange gripping portions with the opposite edges of a beam flange and thus secure the hanger on the flange, and a clamping bolt extending through the clips to secure them together, the blade of one clip being formed with a longitudinally extending slot, the blade of the other clip carrying a stud in position to extend in and move along the slot as the clips are adjusted longitudinally the one with respect to the other, said stud having a head for sliding engagement with the slotted clip blade to secure the clips together for relative longitudinal movement, the stud carrying blade being formed with a longitudinally extending series of equally spaced projections in position registering with said slot and selectively to latchingly engage a detent formed in said slotted blade in line with and spaced outwardly of an end of the slot.

7. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, a longitudinally extending series of equally spaced projections formed on one of said blades in position selectively to latchingly engage a detent on the other blade whereby to latch the clips together in flange gripping position, said other blade having a longitudinal slot in alinement with and terminating adjacent said detent in position to receive the projections other than the one in regisration with the detent, and clamping means for drawing and holding the blades tightly together to secure a detent registering projection in latching engagement with the detent.

8. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, the blade of one clip being adapted to engage the surface of the beam flange between its opposite edges, said flange engaging blade being narrower than the other clip and said other clip being formed with an opening at its flange gripping portion for slidingly receiving the blade of the narrower clip, said flange engaging blade being formed with a longitudinally extending series of equally spaced projections in position selectively to latchingly engage a detent on the other blade immediately inwardly of said flange receiving opening, said other blade having a longitudinal slot in alinement with and having an end terminating adjacent said detent in position to receive the projections other than the one in registration with the detent, and a clamping bolt extending through the clips to draw and secure the blades tightly together with the detent engaging projection clampingly secured in latching engagement in the detent.

9. A hanger comprising a pair of cooperating clips formed each with a blade and a flange gripping portion, one of said blades being supported on and movable relatively with respect to the other, to holdingly engage said flange gripping portions with the opposite edges of a beam flange and thus secure the hanger on the flange, the flange gripping portion of each clip comprising an inwardly bent lip on and at an end of the clip blade on which mounted and spaced therefrom sufficiently to receive the edge of the beam flange therebetween, the blades of the clips being formed with a series of projections on one blade in position to latchingly engage corresponding detent cavities formed on the other, whereby to latch the clips together in flange gripping position on the beam flange, the blades of said clips having registering slots extending lonitudinally thereof, and a clamping bolt extending in said registering slots and through the blades, said bolt being operable in conjunction with a clamping nut to secure the blades together in mounted position on the beam flange, the blade of one clip being adapted to engage the surface of the beam flange between its opposite edges, said flange engaging blade being formed with spaced flange engaging ribs and said clamping bolt having a head extending in the space between said ribs, whereby the bolt may be adjusted freely in said slots transversely of the beam flange whenever the hanger is in mounted position thereon and prior to the tightening of the clamping nut upon the bolt.

References Cited in the file of this patent

UNITED STATES PATENTS

| | | |
|---|---|---|
| 1,245,632 | Straub | Nov. 16, 1917 |
| 1,670,902 | Popps | May 22, 1928 |
| 1,778,700 | Whittier et al. | Oct. 14, 1930 |
| 1,888,342 | Anderson | Nov. 22, 1932 |
| 1,983,670 | Knight | Dec. 11, 1934 |
| 2,517,927 | Reed | Aug. 8, 1950 |
| 2,546,556 | Miller | Mar. 27, 1951 |